Figure 1:
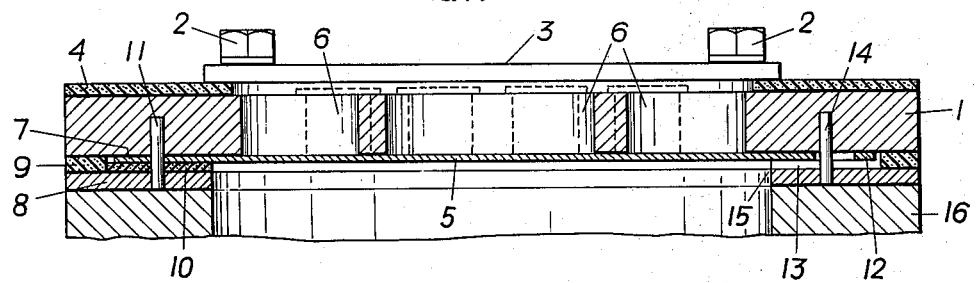

United States Patent [19]

Hrabal

[11] 3,926,214

[45] Dec. 16, 1975

[54] LAMELLA VALVE FOR PISTON COMPRESSORS

[75] Inventor: Hans Hrabal, Vienna, Austria

[73] Assignee: Hoerbiger Ventilwerke Aktiengesellschaft, Vienna, Austria

[22] Filed: June 12, 1974

[21] Appl. No.: 478,731

[30] Foreign Application Priority Data
June 28, 1973 Austria .............................. 5680/73

[52] U.S. Cl. ............................................. 137/525.3
[51] Int. Cl.² .......................................... F16K 15/16
[58] Field of Search .................. 137/525.3; 417/569

[56] References Cited
UNITED STATES PATENTS

| | | | |
|---|---|---|---|
| 1,660,588 | 2/1928 | Wishart et al. .................. | 137/525.3 |
| 2,908,287 | 10/1969 | Augustin .......................... | 137/525.3 |
| 3,039,487 | 6/1962 | Doeg .............................. | 417/569 X |

*Primary Examiner*—William R. Cline
*Attorney, Agent, or Firm*—Watson, Cole, Grindle & Watson

[57] ABSTRACT

A lamella valve construction particularly for use as a suction valve in a piston compressor. The valve comprises a flexible lamella clamped at one end to a seat plate having passage means therein for flow of working fluid. The stroke of the lamella away from the seat plate is limited by a stop at the free end of the lamella, the inner edge of which stop serves as a tilt bearing for the free end portion of the lamella so that in use this free end portion swivels about the tilt bearing and the free end of the lamella strikes against the seat plate whereby the end portion of the lamella becomes trapped between the stop and the seat plate to provide a counter-force limiting further movement of the central section of the lamella.

3 Claims, 3 Drawing Figures

U.S. Patent  Dec. 16, 1975  3,926,214

LAMELLA VALVE FOR PISTON COMPRESSORS

This invention relates to lamella valves suitable for use in piston compressors, particularly as suction valves, and being of the type having a seat plate with passages controlled by a flexible lamella, one end of which is fixedly clamped to the seat plate, and the other end of which is capable of being lifted flap-wise from the seat plate. A stop member spaced from the seat plate being provided for the free end of the lamella.

Lamella valves consist conventionally of flexible tongues or small plates fixedly clamped normally at one end to the seat plate whereas their free section by virtue of its innate elasticity moves over the passages controlled by the tongues in the lifting strokes of the compressor. Such tongues or small plates are of comparatively simple construction and, in the case of a suction valve, have neither their own arrestor nor a closure spring system. The opening stroke is limited merely by a stop member for the free ends of the lamella, for example a milling out in the end wall of the cylinder. If the lamella is comparatively long and thin then during the stroke movement its central section may swing out uncontrollably over the end stop member which specifically limits only the stroke of the end of the lamella. As a result of this, excess stress occur which can lead to rupture of the lamella. It is therefore necessary to carefully adapt the length and thickness of the lamella to the dimensions of the compressor and its operational characteristics, in particular its speed. This is difficult because the length of the lamella is predetermined by the cylinder diameter and the mass and innate elasticity of the lamella frequently change with the thickness of the lamella in an undesirable manner.

In order to avoid such excess stresses it is also conventional to provide lamella valves with a stroke arrestor which specifically defines the stroke movement of the lamella also in its central section. The stroke arrestor is in this case domed like a bridge over the valve and firmly clamps the lamella at one end on to the seat plate, whereas at the other end the lamella is carried loosely with slight play so that it can be displaced longitudinally when the central section of the lamella is domed towards the stroke arrestor. The arrangement of an arrestor overlapping the entire length of the lamella increases the manufacturing outlay and, in particular with suction valves, leads to a considerable increase in the dead space of the compressor, since it projects freely into the compressor. Frequently, there is not even the necessary space available for its own stroke arrestor.

An object of the present invention is to provide a lamella valve of the initially-mentioned type, in a simple manner and without its own arrestor, with an effective means of stroke limitation for the lamella, so that uncontrollable swinging of the lamella is avoided.

The invention provides a lamella valve construction comprising a seat plate formed with passage means, a flexible lamella having one end portion clamped on the seat plate with its other end portion free to move away from the seat plate for controlling fluid flow through the passage means. A stop member for the other end portion of the lamella is spaced from the seat plate. The other end portion of the lamella projects in the longitudinal direction of the lamella over an edge of the stop member whereby the edge is adapted to form a tilt bearing so that the projecting end of the lamella can swivel about the tilt bearing and cause the free end of the lamella to strike against the seat plate to brace the free end portion between the seat plate and the tilt bearing.

In this manner, without the use of its own stroke arrestor and without additional constructional outlay it is possible in a simple manner to brake the opening movement of the lamella effectively and to limit the stroke movement of the lamella also in its central section, so that uncontrollable swinging out and resultant excess stresses on the lamella are minimized. The arrangement according to the invention can be compared functionally to a lamella with a spring system, the spring force being selectable as desired without change in the thickness and width of the lamella.

When the valve is closed the lamella represents a carrier clamped on one side. It can lift itself by its free section from the passages at the beginning of its opening stroke until in the region of its end section it meets the stop member serving as a tilt bearing. Hereupon the stress on the lamella is comparable to that of a one-sided tensioned carrier on two bearings. On further bending, the free end of the lamella is lifted until it strikes against the seat plate. The end section is then clamped between the seat plate and the tilt bearing and forms a bending spring which acts against further bending of the lamella and thus limits the stroke of the lamella also in its central section. The stiffness of this bending spring and with it the damping force acting on the stroke moment of the lamella can be selected as desired, i.e. by selection of the spacing of the tilt bearing from the seat plate measured in the direction of the stroke of the lamella and the length of the end section of the lamella projecting over the tilt bearing.

When the lamella valve is arranged as is customary, particularly with comparatively small compressors, with its seat plate resting on the cylinder and clamped between the cylinder and the cylinder head, the tilt bearing can be formed by the cylinder of the compressor, for example by the edge of the cylinder bore. The necessary gap into which the free end section of the lamella projects can in this case be maintained by suitably dimensioning the thickness of the seal arranged between the cylinder and seat plate, so that for this no recesses in the end surface of the cylinder are necessary. It is necessary to machine the end surface of the cylinder only with eccentric arrangement of the lamella, for example when the valve consists of two or more lamellae placed alongside one another.

In a further embodiment of the invention the tilt bearing may be formed by an intermediate ring arranged on the seat plate. In this case even with the use of several lamellae any machining of the end face of the cylinder or of the cylinder head is superfluous. The intermediate ring can be provided with recesses to form the necessary space for the end sections of the lamellae and of the tilt bearing or may rest on the seat plate with interposition of a seal which is thicker than the thickness of the lamella.

The lamella valve according to the invention is useful particularly as a suction valve since a clear stroke limitation of the suction lamellae can be achieved without use of an arrestor which would increase the size of the dead space of the compressor and for which, with a suction valve, the necessary space frequently would not be available. The invention can however also be used with pressure valves, in which case the arrestor can be omitted and thereby a considerable simplification of manufacturing outlay is achieved without detriment to the functioning and service life of the pressure valve. Furthermore, the invention does not prescribe any particular shape of lamella; they can be strip-shaped or ring-shaped or can also have the shape of a rectangular frame with or without cross-pieces. With the use of ring- or frame-shaped lamella there can be a tongue projecting over the edge of the lamella for use as an end section striking against the tilt bearing and acting as a bending spring for the damping of the opening stroke.

Figure 2:
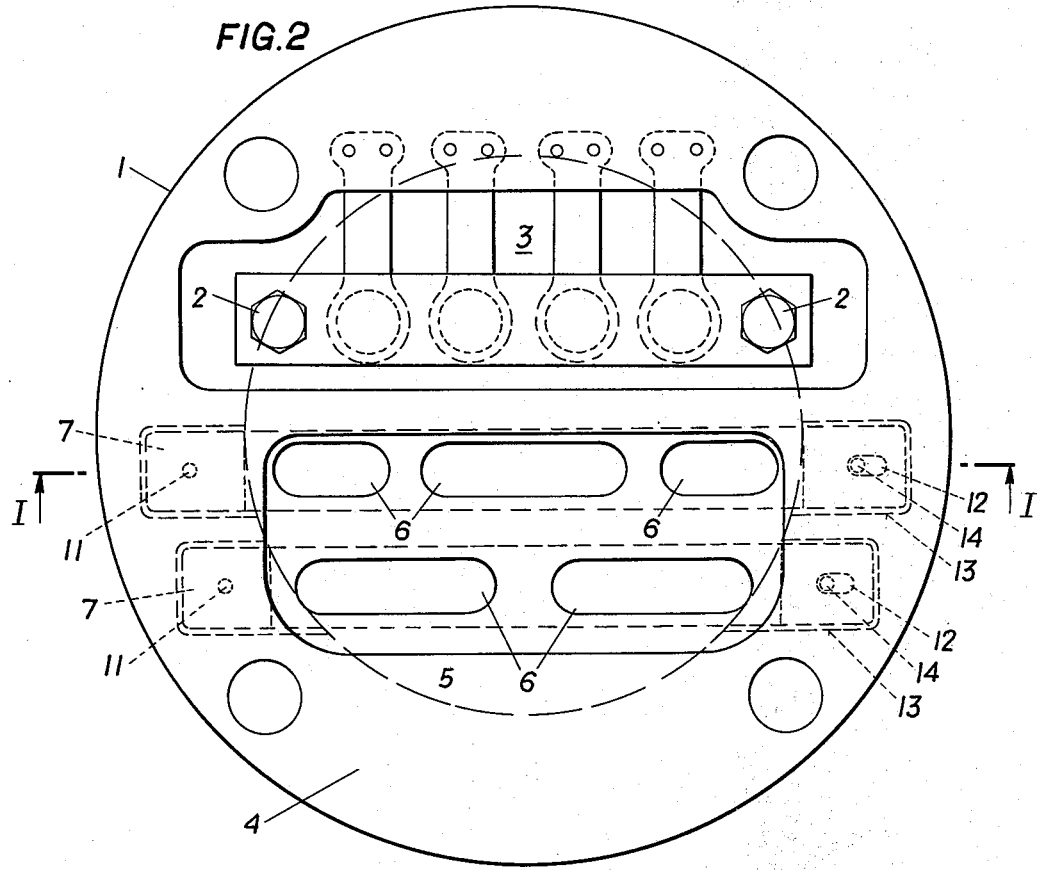
Figure 3:
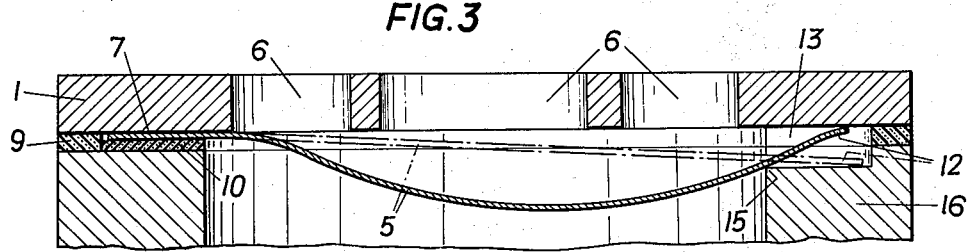

The invention will now be described by way of an example with reference to the accompanying drawings, in which:

FIG. 1 is an axial section along the line I—I in FIG. 2, through one form of the valve according to the invention, FIG. 2 is a plan view of the valve shown in FIG. 1 and FIG. 3 is a side view of a modified valve, and also illustrating the functioning of the valve in accordance with the invention.

In the embodiment shown in FIGS. 1 and 2, a combined valve set is shown for a piston compressor having a suction valve and a pressure valve. The valve set consists of a seat plate 1 on the top of which a pressure valve 3 is fixed by means of screws 2. The pressure valve has a conventional structure and is therefore not described in detail. Also, on the top of the seat plate 1 rests a seal 4 onto which the cylinder head of the compressor can be placed. A suction valve is provided on the underside of the seat plate 1 and consists of substantially two strip-shaped lamellae 5 which control passages 6 in the seat plate 1.

At one end 7, the lamellae 5 are fixedly clamped to the saet plate 1 by means of an intermediate ring 8, the ring 8 being fixed to the seat plate 1 by means of a seal 9. Since the seal 9 is thicker than the lamellae 5, there is, underneath the lamellae 5 between the ends 7 thereof and the intermediate ring 8, an enclosure 10 which advantageously consists of a soft material such as sealing material. For centering the lamellae and for facilitating assembly, pins 11 are provided which pierce the ends 7 of the lamellae 5. The free ends 12 of the lamellae 5 project for a comparatively long section into a gap 13 which lies between the seat plate 1 and the intermediate ring 8 and the height of which is determined by the thickness of the seal 9. Also the ends 12 are in each case pieced by a pin, but in the end sections of the lamellae longitudinal holes are provided (see FIG. 2) which permit a displacement of the lamellae 5 in the longitudinal direction. The radially inner edge of the intermediate ring 8 forms a tilt bearing 15 for the associated lamellae 5.

The purpose of the tilt bearing 15 and also the functioning of the lamella valve according to the invention are described with reference to FIG. 3 which shows a modified suction valve, the seating plate 1 of which rests by means of a seal 9 on the cylinder 16 of a compressor. The ends 7 of the lamellae 5 are fixedly clamped by means of the seal 9, on a seat plate 1 and its other end 12 projects into a gap 13 formed by a recess provided in the end face of the cylinder, the height of which gap is shown on enlarged scale so as to portray more clearly the movements of the lamellae 5.

When the valve is closed as shown in FIG. 1, the lamella 5 rests on the seat plate 1 and closes the passages 6. At the beginning of the opening movememt the lamella 5 first bends away downwardly from the seat plate 1 in the manner of a carrier clamped on one side, until the free end 12 meets the bottom of the gap 13. This intermediate position of the lamella 5 is shown in FIG. 3 in dot-dash lines. Under the effect of the medium flowing through the passage channels 6 the central section of the lamella 5 bends further downwardly until at the edge of the gap 13 it meets the tilt bearing 15. The lamella 5 behaves hereby as a one-sided clamped carrier on two bearings, approximately uniformly loaded in its central area.

The free end of the lamella 12 is initially still located in the lower part of the gap 13. On further bending of the lamella 5 the end 12 rises upwards against the seat plate 1 and finally strikes against it, as is shown in FIG. 3 in solid lines. The end section of the lamella 5 stayed or elastically braced in this manner between the seat plate 1 and the tilt bearing 15, acts as a bending spring, the spring force of which counteracts further opening movement of the central section of the lamella 5. The opening movement of the lamella 5 is thereby elastically arrested so that a limitation of the stroke is achieved and also uncontrolled further swinging of the central section of the lamella 5 is substantially eliminated. The size of the spring force exerted by the trapped end section of the lamella 5 depends on the thickness and width of the end section, in particular on its length, that is to say depends on the distance between the tilt bearing 15 and the end 12 of a lamella abutting against the seat plate 1 and can thus be designed to meet requirements. By the height of the gap 13 the size of the stroke is determined on the achieving of which the damping of the opening movement sets in.

I claim:

1. A lamella valve comprising a seat plate formed with passage means, a flexible lamella having one end portion clamped on the seat plate, the free end of said lamella being movable from said seat plate for controlling fluid flow through said passage means, a stop member for said free end portion of said lamella spaced from said seat plate, a gap formed beween said stop member and said seat plate and said free end portion of said lamella projecting in the longitudinal direction thereof within said gap and over an edge of said stop member whereby said edge is adapted to form a tilt bearing so that the projecting end of said lamella can swivel about the tilt bearing and cause the free end of said lamella to strike against said seat plate to brace said free end portion between said seat plate and said tilt bearing.

2. A valve according to claim 1, wherein said tilt bearing is formed by the inner edge of an intermediate ring mounted a spaced distance from said seat plate.

3. A lamella valve comprising a seat plate formed with passage means, a flexible lamella having one end portion clamped on the seat plate, the free end of said lamella being movable from said seat plate for controlling fluid flow through said passage means, said seat plate being mounted on the cylinder of a piston compressor and a gap is formed between said seat plate and the upper surface of said cylinder, said free end portion of said lamella projecting in the longitudinal direction thereof within said gap and over an edge of said cylinder surface whereby said edge is adapted to form a tilt bearing so that the projecting end of said lamella can swivel about the tilt bearing and cause the free end of said lamella to strike against said seat plate to brace said free end portion between said seat plate and said tilt bearing.

* * * * *